United States Patent [19]

Westerberg et al.

[11] Patent Number: 5,036,179
[45] Date of Patent: Jul. 30, 1991

[54] VISIBLE LIGHT AND INFRA-RED COOKING APPARATUS

[75] Inventors: Eugene R. Westerberg, Palo Alto; Robert I. Beaver, II, Atherton, both of Calif.

[73] Assignee: Quadlux, Inc., Atherton, Calif.

[21] Appl. No.: 350,024

[22] Filed: May 12, 1989

Related U.S. Application Data

[63] Continuation-in-part of Ser. No. 195,967, May 19, 1988.

[51] Int. Cl.$^5$ ............................................. F27B 9/06
[52] U.S. Cl. ..................................... 219/411; 219/405
[58] Field of Search ............... 219/354, 405, 411, 388; 392/416, 418

[56] References Cited

U.S. PATENT DOCUMENTS

| | | | |
|---|---|---|---|
| 2,864,932 | 12/1958 | Forrer | 219/405 |
| 3,037,443 | 6/1962 | Newkirk | 219/411 |
| 3,304,406 | 2/1967 | King | 219/411 |
| 3,313,917 | 4/1967 | Ditzler | 219/405 |
| 3,569,656 | 3/1971 | White et al. | 219/10.55 |
| 4,164,643 | 8/1979 | Peart | 219/411 |
| 4,276,465 | 6/1981 | Flavio | 219/388 |
| 4,410,779 | 10/1983 | Weiss | 219/10.55 F |
| 4,463,238 | 7/1984 | Tanabe | 219/10.55 B |
| 4,481,405 | 11/1984 | Malick | 219/405 |
| 4,486,639 | 12/1984 | Mittelsteadt | 219/10.55 B |
| 4,516,486 | 5/1985 | Burkhart | 99/388 |
| 4,554,437 | 11/1985 | Wagner | 219/354 |
| 4,575,616 | 3/1986 | Bergendal | 219/405 |
| 4,687,895 | 8/1987 | Chitre et al. | 219/10.55 A |
| 4,700,051 | 10/1987 | Goessler et al. | 219/464 |
| 4,731,251 | 3/1988 | Jovanovic | 426/243 |
| 4,761,529 | 8/1988 | Tsisios | 219/10.55 B |

FOREIGN PATENT DOCUMENTS

| | | |
|---|---|---|
| 3503648 | 4/1986 | Fed. Rep. of Germany . |
| 59-47302 | 3/1984 | Japan ........................... 219/405 |
| 1273023 | 5/1972 | United Kingdom . |
| 2132060 | 6/1984 | United Kingdom . |
| 2152790 | 8/1985 | United Kingdom . |

OTHER PUBLICATIONS

Fostoria, "Heat Processing with Infrared", Feb. 1962.
"Ultraviolet and Infra-Red Engineering", by Dr. W. Summer, 1962.
Feggs, E. W., "Quicker Drying with Lamps", Factory Management & Maint. v. 97, No. 7, Jul. 1939, pp. 88–89.

*Primary Examiner*—Teresa J. Walberg
*Attorney, Agent, or Firm*—Limbach, Limbach & Sutton

[57] ABSTRACT

An oven using one or more quartz tungsten light bulbs or quartz arc bulbs capable of producing 1.5 kW of radiant energy of which a significant portion is light energy in the 0.4 to 0.7 μm wavelength range impinges high intensity visible light wave radiation directly onto a food item. Light sources can be positioned above and below the food item and the inner walls of the oven are preferably highly reflective to reflect light energy onto the food. The intensity of the visible light source is automatically controllable and can be varied throughout the cooking cycle.

22 Claims, 2 Drawing Sheets

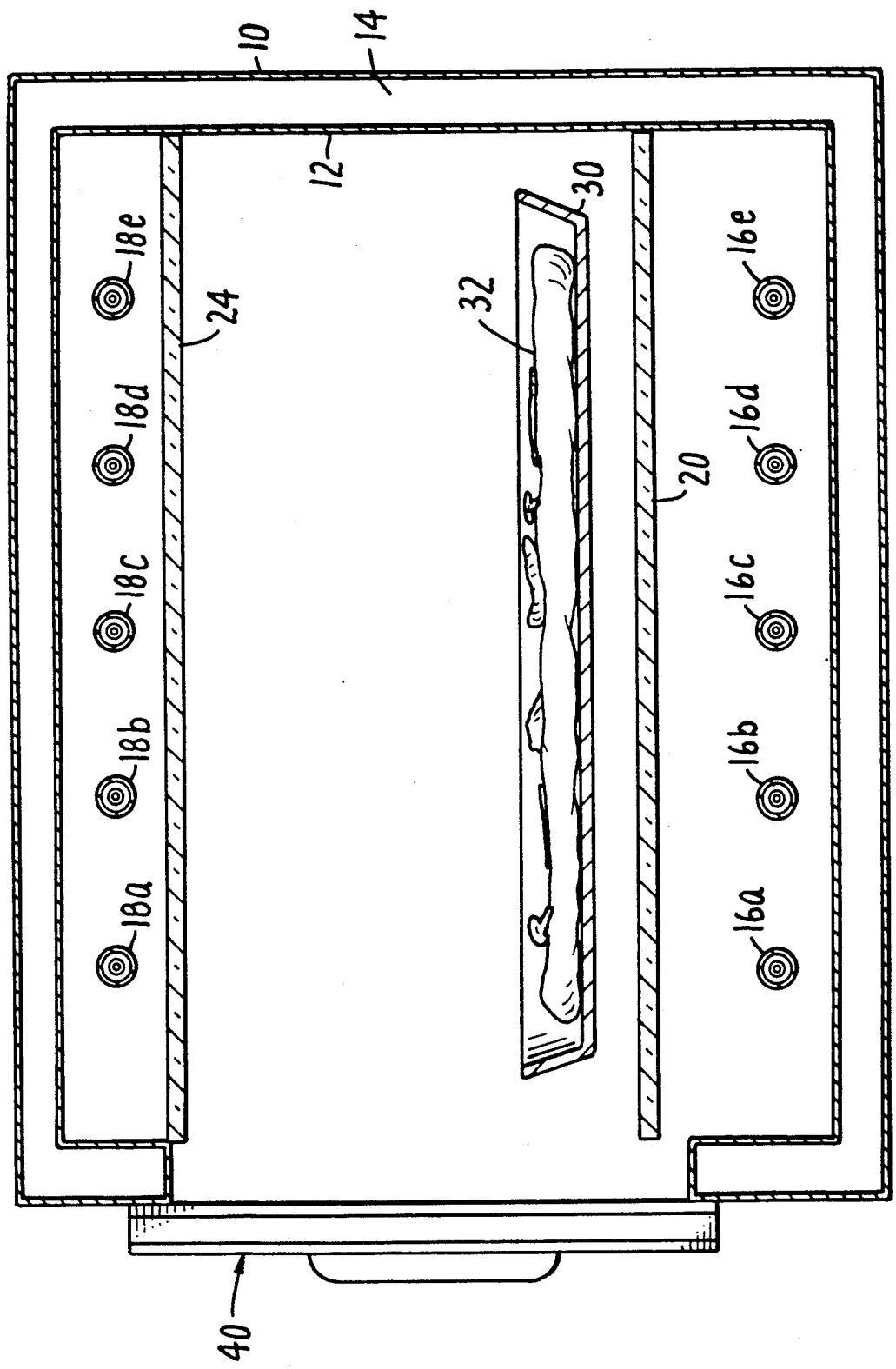

VISIBLE LIGHT AND INFRA-RED COOKING APPARATUS

CROSS REFERENCE TO RELATED APPLICATION

This application is a continuation-in-part of U.S. patent application Ser. No. 195,967 filed on May, 19, 1988.

FIELD OF THE INVENTION

This invention relates to the field of cooking apparatus. More particularly, this invention relates to baking and cooking processes that are substantially faster than such processes in conventional ovens, and offer sensory improvements in quality for many foodstuffs.

BACKGROUND OF THE INVENTION

Ovens for cooking and baking food have been known and used for thousands of years. Basically, oven types can be categorized in four different forms. The simplest and probably the oldest cooking resulted when man put some vegetable or grain products on a hot rock next to a fire, and cooked them essentially by the heat transfer method of conduction. With a little more refinement, an enclosure surrounding the heating element entrapped the heated air giving rise to cooking by convective heat transfer. This was the prototype for the modern gas or electric oven. In the past century, radiant energy from infra-red radiation sources has been used to heat and cook foodstuffs directly. Within the past few decades, microwave radiation has proved useful in allowing very short cooking times for many types of food.

There are subtle differences between cooking and baking. Cooking just requires the heating of the food. Baking of a product from a dough, such as bread, cake, crust, or pastry, requires not only heating of the product throughout but also a chemical reaction coupled with driving the water from the dough in a predetermined fashion to achieve the correct consistency of the final product and finally browning the outside. Following a recipe when baking is very important. An attempt to decrease the baking time in a conventional oven by increasing the temperature results in a damaged or destroyed product.

It has generally been believed that radiation with wavelengths much shorter than 1 $\mu$m is not of much value in cooking or baking processes, partly because of the weaker interaction of the shorter wavelengths with the foodstuff molecules in terms of general heat transfer, and partly due to the inferior penetrating properties of such radiation. In particular, it has seemed that visible light, i.e., radiation with a wavelength in the range of 0.4 to 0.7 $\mu$m, is not very useful in the cooking process. However, if one provides a sufficiently intense source of visible light radiation in conjunction with infra-red radiation, a novel and very effective cooking apparatus results. The combination of the deeply penetrating infra-red and the intense visible radiations establishes a temperature gradient within the interior of the foodstuff. This strong gradient created by the differential absorption of the infra-red and visible radiations ensures that the surface temperature of the foodstuff is hotter than the interior, and the products of the cooking, i.e., the water vapor and gases like $CO_2$, are quickly driven to the surface and out of the foodstuff. This process results in a very rapid cooking of the foodstuff.

Using intense visible and infra-red radiation to cook food has a number of significant advantages. First of all, the cooking process is very fast. Bakery products, like pizza crust for example, can be baked 5 to 10 times faster than ovens that use only infra-red energy or rely on conventional convection and conduction processes. Secondly, the quality of the cooking process is enhanced for many foodstuffs. For example, crusts become fully cooked with crispy exteriors and moist, chewy interiors. Vegetables are cooked so fast that they are virtually steamed in their own water vapor, leaving them hot, but with very little loss of any of their nutritive values.

In general, this is a new mode of cooking. The potentialities of using this enhanced range of wavelengths for cooking and baking are just starting to be explored, and a whole new range of cooking techniques should result from the invention.

SUMMARY OF THE INVENTION

An oven is disclosed for the high-speed, high-quality cooking of food items. The oven includes a means for impinging high-intensity visible and infra-red radiations onto a food item, thereby cooking the item at an accelerated rate over the use of infra-red cooking alone. This cooking process can be aided by conduction. Ordinarily, the radiation impinging means is one or more quartz halogen tungsten lamps, or equivalent means such as quartz arc lamps. Typical quartz-halogen lamps of this type convert electrical energy into black body radiation having a range of wavelengths from 0.4 $\mu$m to 4.5 $\mu$m with a peak intensity at approximately 1 $\mu$m. Each lamp provides about 1.5 kW of radiant energy with a significant portion of the energy in the visible light spectrum. Typical configurations can use one to as many as ten lamps operated in unison, and larger ovens could use even more lamps.

One or more of the radiation source lamps may be used in the cooking process as necessary. These radiation sources are ordinarily positioned above and below the food item. Certain applications may require that radiation sources surround the food item. The walls of the surrounding food chamber are preferably treated to be highly reflective to this radiation. The visible and infra-red waves from the radiation sources impinge directly on the food item and are also reflected on this inner surface of the oven to strike the food item many times and from many angles. This reflecting action results in a greater uniformity of cooking, and since very little of the radiation is absorbed in the surrounding reflecting surface, almost all of the radiant energy is converted into heat upon and within the foodstuff. Hence, this process is a very efficient mode of transferring energy to the foodstuff for cooking, and operation is very economical.

For certain cooking applications, the food item may be placed on a radiant energy absorbing and heat conductive support platter. Such platter can be selectively heated by means of the bottom set of lamps to increase its temperature to a point where it can aid the cooking process by conductive heating, if desired. The platter may be perforated in such a manner so as to facilitate the removal of internal water vapor and gases from the bottom of the foodstuff The intensity of the radiation from the lamps is controllable. Each lamp can be individually controlled or the lamps can be operated in unison to provide the desired cooking result. It is necessary that this control be performed quickly, because of the inherent speed of the cooking process. For certain food products, it is necessary that the intensity be varied throughout the cooking cycle. Such fast and variable intensity control is preferably managed through automatic means, such as computer or microprocessor circuits.

BRIEF DESCRIPTION OF THE DRAWINGS

FIG. 2 shows a side cross section of the preferred embodiment of the present invention.

DETAILED DESCRIPTION OF THE PREFERRED EMBODIMENT

Figure 1:
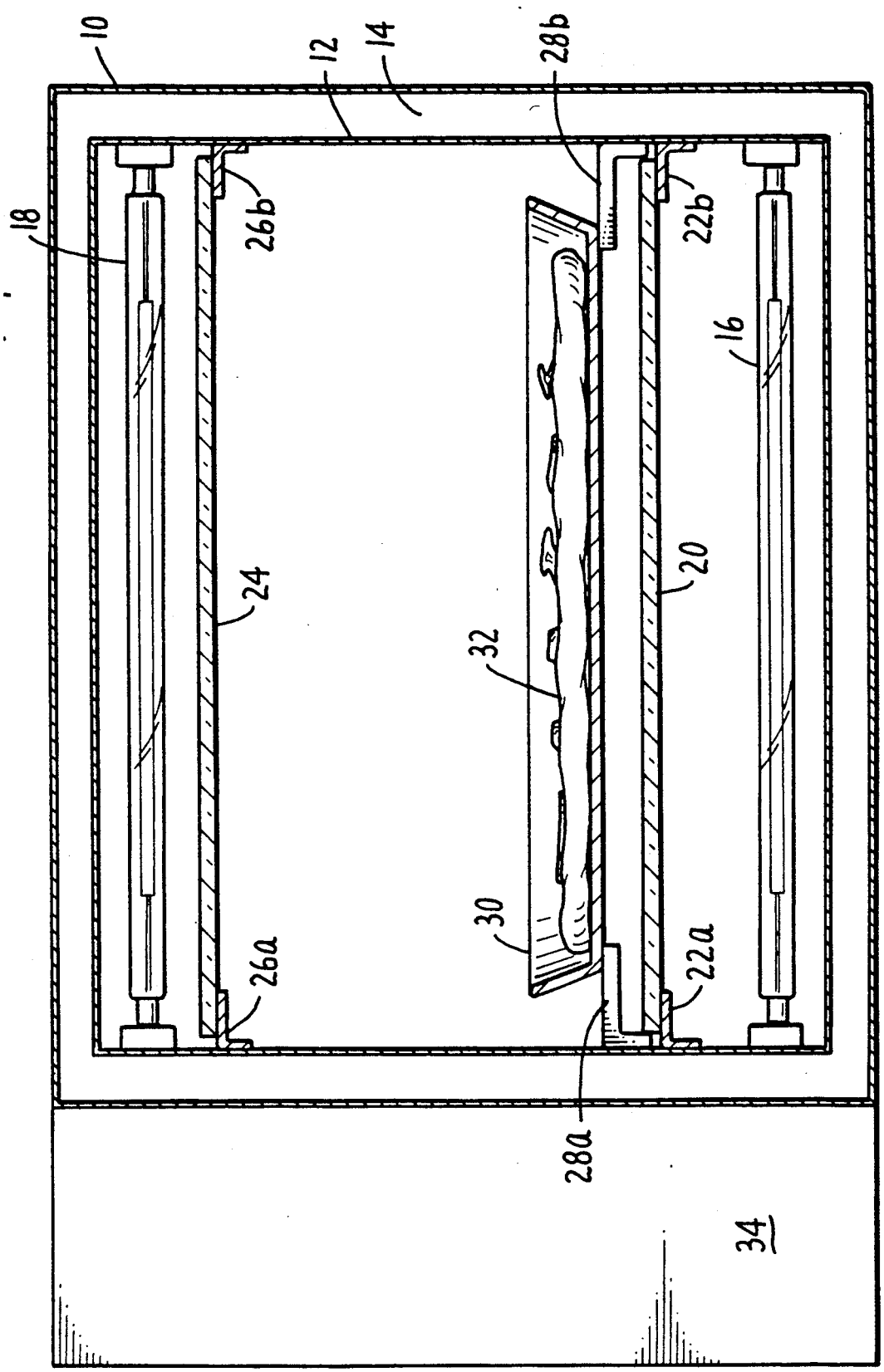
FIG. 1 shows a front cross section of a preferred embodiment of the present invention.

FIG. 1 is a front cross section of the preferred embodiment of the present invention. The oven in FIG. 1 includes an outer enclosure 10. The enclosure has an inner wall 12 coupled to the outer wall 10. Ordinarily, an insulating layer 14 is formed between the outer enclosure 10 and the inner wall 12. Because of the inherent speed of the cooking cycle, the insulating layer 14 may be a layer of air.

The energy for cooking is supplied by the lower radiation heating lamps 16 and the upper radiation heating lamps 18. These lamps are generally any of the quartz body, tungsten-halogen or quartz arc lamps commercially available, e.g., 1.5 KW 208 V quartz-halogen lamps. The oven according to the preferred embodiment utilizes ten such lamps and cooks with an average of 10% of the energy in the visible light portion of the spectrum in the range of 0.4 $\mu$m to 0.7 $\mu$m, which is significant. Quartz xenon-krypton arc lamps have been used as an alternate source in which 95% of the radiation is below 1 $\mu$m and good cooking results have been achieved with their shorter wavelengths.

The inner surface of the inner wall 12 is preferably a highly polished, poorly absorptive surface, so that it appears to be very reflective to the wide spectrum of wavelengths from the radiant lamps. Two radiation transparent plates 20 and 24 are used to isolate the cooking chamber from the radiant sources. These plates can be formed from such materials as quartz or a glass that transmits both visible and infra-red radiations. The lower transparent plate 20 is supported by brackets 22a and 22b and is positioned above the lower lamps 16. The upper transparent plate 24 is supported by brackets 26a and 26b and is positioned below upper lamps 18.

Brackets 28a and 28b support platter 30. The platter 30 is positioned above the lower transparent plate 20 and below the upper glass plate 24. A food item 32 is positioned on platter 30 to be cooked. The control circuit 34, shown as a circuit block, controls the operation of lamps 16 and 18.

The lamps 16 and 18 produce very high intensity visible and infra-red radiations. Prior art use of radiant energy heat sources teach cooking using radiation in the infra-red portion of the electro-magnetic spectrum. For example, see Malick U.S. Pat. No. 4,481,405 and Bassett U.S. Pat. No. 4,486,639. Burkhart, in U.S. Pat. No. 4,516,486, discloses a radiant energy cooker for the exclusive purpose of charring the surface of foods, particularly meats.

The use of both high intensity visible and infra-red radiations provides a very rapid method of high-quality cooking and baking. The radiant energy from the lamps 16 and 18 radiates from the bulb in all directions. A portion of the energy radiates directly onto the food item 32. The remainder of the energy will be reflected off the polished surface of the preferably metal inner wall 12 and strike the food item 32 for more efficient cooking.

The platter 30 may be formed of a material similar to the transparent plates 20 and 24 to allow even cooking of food item 32. However, in some circumstances it may be desirable to crisp the bottom of the food item 32. As a particular example, when cooking a pizza, it is desirable that the crust be light and crispy, rather than soggy and doughy. In such an application, the cooking platter 30 should be formed of a radiation absorbing, heat conducting material, such as black anodized aluminum. In this way, the lower lights 16 would rapidly heat the platter 30 to a high temperature in order to crisp the bottom of the pizza. It may also be desirable to perforate the platter 30 in order to allow steam to escape from the cooking pizza dough. The platter 30 should touch the support brackets 28a and 28b over very limited areas, so that the heat delivered to platter 30 is not lost by conduction.

It is possible to control the lights 16 and 18 independently with the control circuit 34. The control circuit 34, shown as a circuit block in FIG. 1, may include a microprocessor or a microcontroller and associated memory to store individual cooking recipes to control proper heating of the food product.

For example, in cooking a pizza, it may be desirable to run the upper lamps 18 at a reduced power level for a time. For a pizza having fresh vegetables, this would prevent the overcooking of the vegetables making them mushy. The lower lamps 16 might be operated at a higher power level to make the pizza crust light and crispy.

For example, to cook a cheese pizza, the upper lamps are operated at 4.8 KW for 40 seconds while the lower lamps are operated at 6.0 KW until the pizza bottom temperature reaches 500° F. at which time power is reduced to maintain that temperature. For a vegetable pizza having broccoli, mushrooms, onions, the upper lamps are operated at 4.0 KW for 45 seconds. The lower lamps are operated as described above. The longer time is needed to raise the water that is naturally stored in the vegetables to a sufficiently high temperature.

FIG. 2 shows a side cross section of the preferred embodiment of the present invention. In the preferred embodiment, there are 5 lower lamps 16a through 16e and 5 upper lamps 18a though 18e. By appropriately selecting the lateral spacing between the lamps relative to the food, even cooking can be achieved over the entire surface. A door 40 is also shown.

Experimental results show that cooking with one lamp above and one below, i.e. impinging a maximum of 3 KW of radiant energy onto a pizza, does not achieve the dramatic improvement in speed that is possible according to the present invention. The oven in the preferred embodiment includes 5 lamps above and 5 lamps below. This number provides for a maximum of 15 KW of cooking energy.

While cooking a pizza in the range of about 5 KW to 15 KW an approximately inverse linear relationship develops between time and cooking power. In other words, as the power delivered to the pizza is doubled, the time to cook a pizza is cut in half. This result is totally unexpected in view of conventional oven baking where increasing oven temperature results in a burnt product which may have uncooked interior.

Microwave ovens cannot be used in cooking high quality freshly prepared pizza. The commercially available frozen pizzas for microwave ovens are precooked and then frozen. The pizza is merely heated to the proper serving temperature in the microwave oven, but the result is usually tough and soggy. A higher quality pizza can be baked in a commercial grade conduction/convection oven. Here, the pizza is placed directly on the hot floor of the oven to properly crisp the bottom of the crust (up to 900° F. in a brick oven). Unfortunately, the ovens have various "hot" spots and require constant operator attention to avoid over or under cooking the pizza, i.e., consistency is a major problem. The ovens cook a pizza in 5 to 20 minutes. Conveyorized infra-red and hot air convection ovens can cook a pizza in 5 to 15 minutes, but have great difficulty in properly crisping the bottom of the pizza. A pizza can be cooked in the present invention in 35 to 45 seconds. This speed is very important in the commercial pizza market because it enables pizza to be produced in a manner that would qualify it as a true fast-food.

The energy efficiency of the present invention is illustrated by the fact that the energy cost to cook such a pizza is about $0.01. The majority of the radiant energy produced by the oven is utilized in cooking the pizza and after the cooking process is completed the energy is turned off. In contrast, conventional commercial pizza ovens must be preheated to desired cooking temperatures. Ordinarily, the oven in a pizza restaurant is left on all day, whether cooking a pizza or not, making the energy consumption significant.

The oven of the present invention is not limited to cooking pizzas. Certain foods are cooked with more consistent and reliable results than with conventional techniques. For example, cooking vegetables, such as broccoli, so that they retain good texture is difficult using prior art techniques. Generally, such items are preferred al dente. The short cooking times of the present invention, about 20 seconds for broccoli, bring the product to serving temperature so rapidly that the vegetable maintains its crisp, firm texture.

The oven of the present invention may also be used cooperatively with other cooking sources. For example, the oven of the present invention may include a microwave radiation source. Such an oven would be ideal for cooking a thick food item such as a roast beef. The microwave radiation would be used to cook the interior portions of the meat and the infra-red and visible light radiation of the present invention would cook the outer portions. Further, the oven according to the present invention could be used with a convection oven or with both convention oven and microwave oven cooking sources.

The present invention was described in relation to a preferred embodiment. However, it will be apparent to one skilled in the art that one can change the parameters and still practice an invention within the spirit and scope of the present invention.

What is claimed is:

1. An oven for cooking a food item having a first temperature, wherein the oven comprises:
   a) means for generating at least 5 KW of radiant energy in the electromagnetic spectrum, wherein significant portion of the radiant energy has a wavelength in the range of 0.4 $\mu$m to 0.7 $\mu$m and at least 90% of the radiant energy has a wavelength less than 1.0 $\mu$m; and
   b) means for directing the energy to impinge directly on the food in order to bring the food to a second temperature, the second temperature being higher than the first temperature, the means for directing comprising an enclosure surrounding the means for generating having an outer surface and an inner surface, the inner surface being reflective of the radiant energy.

2. The oven according to claim 1 wherein said means for generating energy includes a plurality of sources of energy positioned spatially around the food.

3. The oven according to claim 2 wherein said food item has an upper surface and a lower surface, and further wherein said plurality of sources is comprised of a first group of sources positioned above said upper surface and a second group of sources positioned below said lower surface.

4. The oven according to claim 1 wherein the means for generating radiant energy is comprised of a quartz body tungsten halogen lamp.

5. The oven according to claim 1 wherein said enclosure is insulated.

6. The oven according to claim 1 further comprising a first glass plate and a second glass plate, said first plate being positioned between said first group of sources and said food item and said second plate being positioned between said second group of sources and said food item, said first plate and said second plate being transparent to said radiant energy.

7. The oven according to claim 1 further comprising a platter for holding said food item wherein said platter is transparent to said radiant energy.

8. The oven according to claim 1 further comprising means for differentially controlling each of said plurality of sources by time and by intensity.

9. The oven according to claim 1 wherein the means for generating radiant energy is comprised of a quartz arc lamp.

10. The oven according to claim 1 wherein the relationship between cooking time and cooking power is substantially linear.

11. An oven for cooking and baking food comprising:
   a) a cooking chamber having reflective inner walls and a food location centrally thereof;
   b) a plurality of means for generating radiant energy in the electromagnetic spectrum, wherein more than 90% of the radiant energy has a wavelength less than 1.0 $\mu$m, where the means for generating are positioned inside the cooking chamber and spatially surround the food location for impinging the radiant energy directly on the food location; and
   c) a container for holding the food while cooking which is transparent to the radiant energy.

12. The oven according to the claim 11 wherein at least 5 KW of radiant energy is generated.

13. The oven according to claim 12 wherein the relationship between cooking time and cooking power is substantially linear.

14. The oven according to claim 13 wherein said means for generating radiant energy comprises quartz body tungsten lamps.

15. The oven according to claim 14 further comprising a plurality of radiant energy transparent plates positioned in said chamber between said food and said lamps.

16. A pizza oven for cooking and baking a pizza pie and forming a cooked pizza therefrom, the pizza having a crust formed of dough and toppings formed of a variety of foodstuffs, comprising:

a) a cooking chamber having reflective inner walls and a pizza location centrally thereof;
b) a plurality of quartz body tungsten lamps for generating at least 5 KW of radiant energy having more than 90% of the radiant energy in the electromagnetic spectrum having a wavelength less than 1.0 μm, the lamps having a first group of lamps inside the cooking chamber positioned above the pizza location and a second group of lamps inside the cooking chamber positioned below the pizza location for impinging the radiant energy directly onto the pizza location;
c) a plurality of plates which are transparent to radiant energy positioned between the pizza location and the lamps; and
d) means for controlling the first group of lamps and the second group of lamps differentially by time and intensity.

17. A method of cooking and baking food comprising:
a) generating at least 5 KW of radiant energy in the electromagnetic spectrum, wherein a a significant portion of the radiant energy has a wavelength in the range of 0.7 μm to 0.7 μm and at least 90% of the energy has a wavelength less than 1.0 μm; and
b) directing the energy to impinge directly on the food in order to bring the food to a second temperature, the second temperature being higher than the first temperature.

18. The method according to claim 17 wherein the step of generating further comprises spatially positioning a plurality of energy sources around the food.

19. The method according to claim 18 wherein the step of positioning further comprising positioning a first portion of the sources above and and a second portion of the sources below the food.

20. The method according to claim 18 further comprising the step of controlling the first portion of sources differentially by time from the second portion of sources.

21. The method according to claim 18 further comprising the step of controlling the first portion of sources differentially by intensity from the second portion of sources.

22. A method for cooking and baking a raw pizza pie in a cooking chamber having reflective inner walls comprising the steps of:
a) generating at least 5 KW of radiant energy in the electromagnetic spectrum, wherein at least 90% of the radiant energy has a wavelength less than 1.0 μm by using a plurality of quartz body tungsten lamps, the lamps having a first group of lamps inside the cooking chamber positioned above the pizza and a second group of lamps inside the cooking chamber positioned below the pizza for impinging the radiant energy directly onto the pizza;
b) positioning a plurality of plates which are transparent to radiant energy between the pizza and the lamps; and
c) controlling the first group of lamps and the second group of lamps differentially by time and intensity.

* * * * *

UNITED STATES PATENT AND TRADEMARK OFFICE
CERTIFICATE OF CORRECTION

PATENT NO. : 5,036,179
DATED : July 30, 1991
INVENTOR(S) : Eugene R. Westerberg and Robert I. Beaver, II It is certified that error appears in the above-identified patent and that said Letters Patent is hereby corrected as shown below:

In the Claims:

In Col. 5, line 62, before "significant" please insert --a--.

In Col. 7, line 25, after "wherein" please delete the first occurrence of "a".

In Col. 7, line 27, after "range of" please delete "0.7 $\mu$m" and replace with --0.4 $\mu$m--.

In Col. 8, line 6, after "above" delete the first occurrence of "and".

Signed and Sealed this

Fifteenth Day of December, 1992

Attest:

DOUGLAS B. COMER

Attesting Officer     Acting Commissioner of Patents and Trademarks